Sept. 27, 1966    YASUHIRO SAWADA    3,275,431

SINTERING APPARATUS WITH AUTOMATIC CONTROL

Filed July 9, 1963    4 Sheets-Sheet 1

INVENTOR.
Yasuhiro Sawada
BY Wenderoth, Lind and Ponack,
Attorneys

United States Patent Office 3,275,431
Patented Sept. 27, 1966

3,275,431
SINTERING APPARATUS WITH AUTOMATIC CONTROL
Yasuhiro Sawada, Kitakyushu, Japan, assignor to Yawata Iron & Steel Co., Ltd., Tokyo, Japan
Filed July 9, 1963, Ser. No. 293,737
10 Claims. (Cl. 75—5)

This invention relates to a control system for automatically controlling an apparatus to be controlled (for example, a continuous belt-type baking apparatus such as a Dwight-Lloyd type sintering machine) by detecting such variables as the thickness and density of the charge layer or the temperature and pressure of the waste gas, etc., as electric signals and by combining corrections in the form of a pulse control and a step control with each other for correcting the movements of such a continuous belt-shaped baking apparatus.

It has been a well-known fact that, for example, in a Dwight-Lloyd type sintering machine, such variables as the thickness and density of the charge layer or the temperature and pressure of the waste gas are most important as indicating the correctness or incorrectness of the sintering process. In order to keep these variables at the optimum conditions so as to keep the sintering process at optimum conditions, the control of the inputs of the apparatus has been made arbitrarily.

However, it has been impossible to accurately control these variable conditions which are irregular and indefinite quantities. The incorrect control which results has caused excess of control, and has not only reduced the yield and production of sintered ores but also caused a great fluctuation of the quality.

Noting that in processes containing such variables which are irregular or indefinite or containing nonlinear elements, e.g. conditions which are not of a linear type or of a type having a linear relation to the input and output, such as in a Dwight-Lloyd type sintering process, even when an automatic control system such as, for example, continuous or discontinuous control, has been commonly used, it will be impossible to carry out adequate automatic control, I have already suggested a control method for use with a Dwight-Lloyd sintering machine in which the control is either a rectangular wave or a step type. By rectangular wave type control is meant the varying of the inputs to the apparatus from a pre-established norm and, after a period of time, the return of the inputs to the pre-established norm. By step type control is meant the varying of the inputs to the apparatus without an automatic subsequent return of the inputs from their changed values. However, while such a control system has various advantages, it also has defects. For example, when the control is in a rectangular wave type, when the external disturbance producing the bad effects in the operation of the system lasts for a long time, a rectangular wave type manipulation response will be produced again and again and the system will not be stabilized. When the control is step type, the change in the manipulated input cannot be too large and the control response will be slow when there is a sudden fluctuation in the operating conditions. Therefore, a cycling of a fixed frequency will be produced and the system will be rather unstable.

According to the present invention, with a view to eliminating these defects, variables, such as, for example, the thickness of the charge layer and the temperature and pressure of the waste gas, are detected and converted to electric signals at the detecting end of the control system and, when the variables move outside of a set range, the electric signals will be transmitted to the control end of the systems as signals of a multi-position action (which is a controlling action in which the control end responds to the manipulated quantity of more than three positions due to the detected value of more than three positions corresponding to the fluctuation of the controlled quantity) and, in the control system, controls are so combined that the continuous signals are converted to rectangular wave form pulse signals of any frequency which are one output of the control system and which are also accumulated and memorized. The manipulated apparatus for example, a continuous belt-shaped baking apparatus such as a Dwight-Lloyd type sintering machine can therefore be controlled in rectangular wave type control by the pulse signals and in step control if the accumulated and memorized signals reach a predetermined limit. Therefore, the pulse or wave type control will control the fluctuation of the variables for short term variations, and the step type control will control the fluctuation for long term variations or fluctuation in the same direction which are repeated several times.

The automatic control system, wherein the pulse and step type controls are thus combined so as to carry out the optimum control, is as follows for a Dwight-Lloyd type of sintering machine.

| | For the charge layer | For the temperature and pressure |
|---|---|---|
| Detected variable | Fluctuation of the thickness of the charge layer | Fluctuation of the temperature and pressure of the waste gas. |
| Controlled characteristic | Thickness of the charge layer | Sintered state. |
| Manipulated input to apparatus | Speed of the continuous belt-shaped baking machine (sintering machine). | Speeds of the continuous belt-shaped baking apparatus, ore feeding apparatus and cooler. |
| Manipulated portion of apparatus | Continuous belt-shaped baking member (sintering machine). | Continuous belt-shaped baking member (sintering machine), ore feeding machine and cooler. |

The above combination is shown only as an example.

When such an automatic control system as is described above is used, a satisfactory control will be possible for a continuous belt-shaped baking apparatus, and a control which is satisfactory enough will be possible even in a process containing many conditions which are nonlinear and which vary in irregular, indefinite and unpredictable ways. Not only the quality but also the yield of the product will be improved and it will contribute to a large increase in production.

The invention will now be explained in connection with the accompanying drawings in which.

Figure 1:
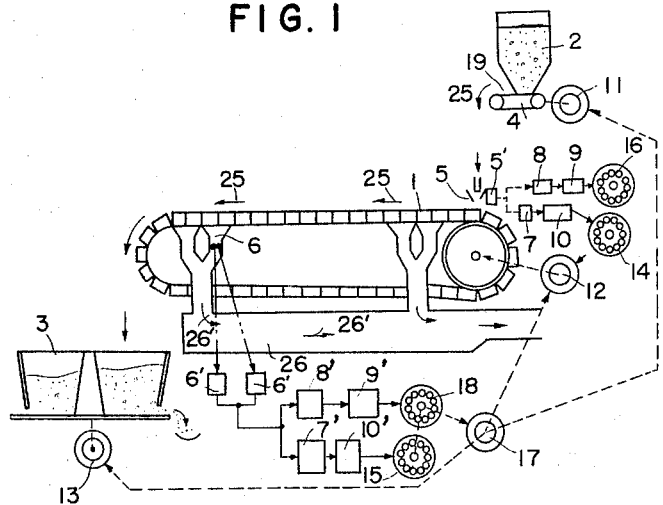
FIGURE 1 is a schematic view of a sintering apparatus set up to operate with the control system of the present invention.

Referring now to the figures, there is shown in FIG. 1 a schematic representation of a Dwight-Lloyd sintering machine in which a storage container 2 is positioned above a belt feed conveyor 4 which is driven by a feed conveyor driving motor 11. Beneath the belt feed conveyor 4 is the main sintering machine conveyor 1 which is driven by a main motor 12. Positioned above the main conveyor 1 at the end thereof to which the raw material is fed is a feeler 5 for detecting the thickness of the layer of material to be sintered as an electric signal. Along the length of the conveyor 1 are positioned waste gas pipe branches for drawing waste gas from the upper run of the main conveyor 1 into the waste gas pipe 26, and in the last branch are an electron tube type thermometer and pressure gauge 6. At the end of the main conveyor 1 is a cooler 3 into which the sintered material is dumped by the main conveyor 1, and the cooler is driven by a cooler driving motor 13. The cooler discharges the sintered and cooled material.

In operation, the raw material is fed from the storage container 2 and is conveyed by the belt feed conveyor 4 in the direction of the arrows 25 onto the main conveyor 1. The thickness of the layer formed on the main conveyor 1 is detected by the feeler 5, as an electric signal and this detected variable condition is used in the control of the manipulated input to the apparatus in a manner to be described. Thereafter the material is ignited and conveyed along the upper run of conveyor 1, and the waste gases are drawn downwardly through the branch pipes into the waste gas pipe 26 in the direction of arrows 26'. The sintered material is dumped off the end of the upper run of the conveyor 1 into the cooler 3, where it is cooled and discharged for use. The waste gas drawn down through the last branch pipe has the temperature and pressure thereof detected by the thermometer and pressure gauge 6 in the form of an electric signal and these detected variable conditions are also used in the control of the manipulated input to the apparatus in a manner to be described.

Figure 8:
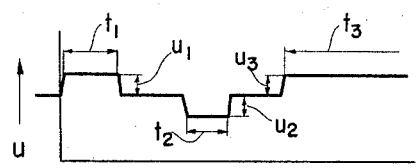
FIG. 8 is a graphic representation of the operation of the process in which a disturbance in case of the detected variables has occurred in the form of steps.
Figure 9:
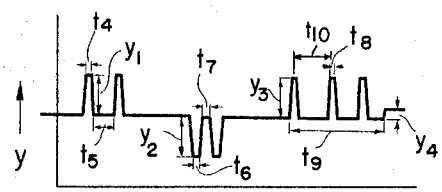
FIGURE 9 is a graphic representation of the operation of the manipulated portion of the apparatus to correct the disturbance.
Figure 10:
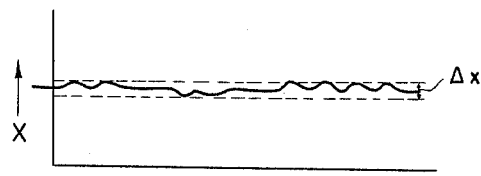
FIGURE 10 is a graphic representation of the controlled characteristic.

Control of the apparatus is carried out in a manner graphically illustrated in FIGS. 8–10. If a temporary disturbance $u_1$ occurs in the operation of the apparatus for a period of time $t_1$, as shown in FIG. 8, it will cause a fluctuation $\Delta x$ in one of the detected conditions as shown in FIG. 10, for example the thickness of the layer of material being sintered. If the change is in the positive direction, i.e. the layer becomes too thick, a rectangular wave type control is exerted on the manipulated input to the apparatus in the manner shown in FIG. 9. A rectangular wave type pulse of amplitude $y_1$ and with a period $t_4$ is caused in the manipulated input, and if the disturbance is still present at the end of an interval $t_5$ following the first pulse, a second pulse of the same amplitude and period is caused in the manipulated input. In the example shown, to correct the thickness of the layer of material, the pulse would be an increase in the speed of the main driving motor 12 for a period of time $t_4$. Also in the example shown, since the disturbance $u_1$ is no longer present at the end of the second pulse, no further control pulses are caused in the manipulated input.

Thereafter, if a second temporary disturbance of $u_2$ occurs in the operation of the apparatus and lasts for a period of time $t_2$, control pulses of amplitude $y_2$ and period $t_6$ are exerted in the manipulated input, which pulses occur at times spaced by $t_7$. Since the disturbance $u_2$ is of the opposite sense from the disturbance $u_1$, the correction $y_2$ is in the opposite direction from the correction $y_1$.

If a disturbance $u_3$ which is either permanent or of long duration occurs in the operation of the apparatus, the control system of the present invention will first exert a series of pulses of amplitude $y_3$ and period $t_8$ at intervals of $t_{10}$. After a period of time $t_9$, however, the system will sense that the disturbance is not being corrected except temporarily, as shown in FIG. 10, and a step type of correction $y_4$ will be made in the manipulated input. As seen in FIG. 9, this correction is permanent insofar as it can be compared to the rectangular wave control pulse in that the manipulated input is changed and is not thereafter returned to its initial value automatically. Of course should the disturbance disappear, a step type of control will eventually, i.e. after a series of control pulses, be exerted in the opposite direction to the step $y_4$ to return the manipulated input to its initial value.

In practice, the deviation of the detected variable from the optimum must exceed a permissible amount before the control circuits will be actuated. The control means for carrying out this type of control in the apparatus comprise a plurality of circuits connected to the detecting means in the form of the feeler 5 and the thermometer and pressure gauge 6. Connected to the feeler 5 is a detecting, controlling and condition memorizing circuit 5' which compares the detected variable, in this case the signal representing the thickness of the layer of material with a signal representing the desired optimum of the variable, in this case the thickness. Circuit 5' also acts to control further circuits if the comparison shows the variation to be greater than allowable, and memorizes the fact that the variation is greater than allowable. Connected to the circuit 5' is a pulse switching circuit 7 which is controlled by the circuit 5' and which in turn acts to produce rectangular wave type control pulses at a predetermined frequency and for a predetermined period for each pulse. Connected to the pulse switching circuit 7 is a pulse control circuit 10 which controls the amplitude of the rectangular wave type control pulse.

Connected to the pulse control circuit 10 is a means for controlling a manipulated input to the apparatus, in this case a pulse field current regulator 14 which is connected to the main drive motor 12 and which produces a rectangular wave type pulse in the field current for the main driving motor 12, under the control of circuits 7 and 10, and which will therefore cause a rectangular wave type control pulse in the drive of the main conveyor 1, which drive is the manipulated input for the sintering machine.

Also connected to the detecting circuit 5' is an accumulating and memorizing and step switching circuit 8 which memorizes the sense in which the signal indicating the detected variable is outside the limits for the optimum thickness of the layer of material and accumulates the time during which the detected variable is outside the limits. It also causes a step type of change after the accumulating part of the circuit has indicated that the detected variable is outside the limits for a predetermined period of time. Connected to the circuit 8 is a step control circuit 9 which controls the amplitude of the step type of change. The circuit 9 is connected to a means for controlling the manipulated input, also in this case a step field current regulator 16, which is in turn connected in series with the pulse field current regulator 14, so that the step field current regulator 16 produces a step type change in the field current for the main driving motor 12 under the control of the circuits 8 and 9, and which therefore will cause a step type change in the drive of the main conveyor 1, which is the manipulated input.

Connected to each of the thermometer and pressure gauge 6 is a detecting, controlling and condition memorizing circuit 6' which compares the signal representing the detected variable, in this case the temperature or pressure of the waste gas with a signal representing the desired optimum of the variable, here the desired optimum temperature or pressure of waste gas. Circuit 6' acts to control further circuits if the comparison shows the variation to be greater than allowable, and memorizes the fact that the variation is greater than allowable. Connected to the circuits 6' is a pulse switching circuit 7' which is controlled by either circuit 6' and which in turn acts to produce rectangular wave type control pulses at predetermined frequency and for a predetermined period for each pulse. Connected to the pulse switching circuit 7' is a pulse control circuit 10' which controls the amplitude of the rectangular wave type control pulse.

Connected to the pulse control circuit 10' is a means for controlling a manipulated input, in this case a pulse field current regulator 15, which is connected to the generator 17 and which produces a rectangular wave type pulse in the field current for the generator 17 under the control of the circuits 7' and 10', and which will therefore cause a rectangular wave type control pulse in the output of the generator 17.

Also connected to the detecting circuits 6' is an accumulating and memorizing and step switching circuit 8' which memorizes the sense in which the signal indicating the detected variable is outside the limits for the optimum waste gas conditions. It also causes a step type of change after the accumulating part of the circuit has indicated that the detected variable is outside the limits for a predetermined period of time. Connected to the circuit 8' is a step control circuit 9' which controls the amplitude of the step type of change. The circuit 9' is connected to means for controlling the manipulated input, here again a step field current regulator 18 which is connected in series with the pulse field current regulator 15, so that the step field current regulator produces a step type change in the field current, for the generator 17 under the control of the circuits 8' and 9', and which will therefore cause a step type of change in the output of the generator 17.

The generator 17 is connected to the belt feeder drive motor 11, to the cooler drive motor 13, and to the main drive motor 12, so that the control pulses and the step changes will cause corresponding accelerations and decelerations of the belt feed conveyor, the main conveyor, and the cooler, which accelerations and decelerations are the manipulated input.

Figure 2:
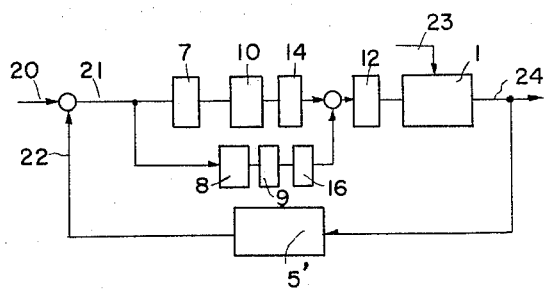
FIGURE 2 is a schematic representation of the control system for controlling the thickness of the layer of material to be sintered.

The manner in which the control means is linked to carry out the control is shown schematically in somewhat more detail in FIG. 2. When a disturbance $u$, such as shown in FIG. 8, is applied to the apparatus 1, the detected variable 24 will produce a signal 21 which is compared with a reference input 20 which represents the maximum limits outside of which the detected variable should not stray. The comparison is made in a part of the circuit 5', and if the difference between the two signals is too large, indicating that the detected variable is outside the limits set for it, the remainder of circuit 5' will remember that the detected variable has varied too much, and will produce a signal 22 to control further circuits. When the apparatus is a sintering machine, the detected variable 24 may be the thickness of the layer of material.

The signal 22 actuates the step switching circuit 7 to cause it to produce rectangular wave type control pulses at a predetermined frequency, and the step control circuit 10 will control the amplitude and period of the control pulses. The two circuits 7 and 10 will actuate the means 14 for controlling the manipulated input, which in turn will control the manipulated input to the apparatus 1 through the means 12 for producing the manipulated input. In the case of the sintering machine, the means 14 is the pulse field current regulator, and the means 12 is the main drive motor.

As long as the signal 22 is produced because of the difference between the reference input 20 and the signal 21, the circuits 7 and 10 will continue to pulse. If the disturbance 23 is only temporary, the detected variable should soon return within the limits set for it, whereupon the signal 21 will compare favorably with the reference input 20 and the signal 22 will no longer be produced.

The signal 22 also actuates the accumulating and memorizing and step switching circuit 8 to cause it to memorize the sense in which the signal 21 differs from the norm indicated by the reference input 20, i.e. whether it is above the upper limit or below limit. The circuit also memorizes the length of time that the signal 21 varies more than the permissible amount from an optimum, and after a predetermined time, sets in motion the generation of a step type of control. The step control circuit 9 will control the amplitude of the step, and the two circuits 8 and 9 will actuate the means 16 for controlling the manipulated input, which in turn will control the manipulated input to the apparatus 1 through the means 12 for producing the manipulated input. In the case of the sintering machine, the means 16 is the step field current regulator, and the means 12 is the main drive motor.

If the signal 22 ceases before the elapse of the predetermined time, no step control will occur. However, if the signal 22 continues, the circuit will act to make a correction which will not automatically be eliminated after a short time. The step control will change the manipulated input until such time as the disturbance ceases or changes to some other value. Since the step control will cause a change in the detected variable, there will be a corresponding change in signal 21 to bring it back into the permissible limits of variation from the optimum.

Figure 3:
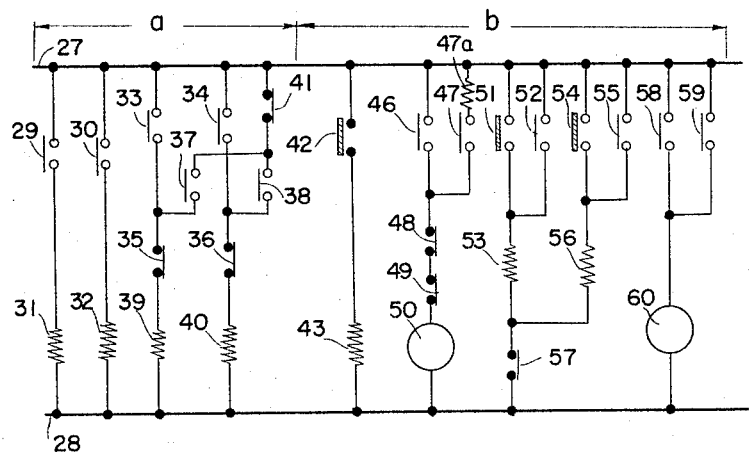
FIGURES 3, 4 and 5 are circuit diagrams for the control system of the present invention.

The circuits for carrying out the control are shown in detail in FIGS. 3–6. In FIG. 3, there is shown only part of the entire circuit 5'. Since the circuit for comparing two signals is a circuit well known in the art, it has not been shown.

Part $a$ of the circuit shown in FIG. 3 which is a detecting, controlling and condition memorizing circuit, normally open contacts 29 and 30 which are closed when actuated by coils, not shown, which are energized by signals from the means for comparing the signals. The contact 29 is, in a particular embodiment of the invention, the contact for the upper limit of the condition being measured, while the contact 30 is for the lower limit of the condition being measured. It will be understood, moreover, that more than one contact can be used in place of the contact shown, the contacts being either in parallel or series, depending on the manner of control and the manner of exercising control in response to a change in one or more conditions.

The contacts 29 and 30 are respectively connected across a power supply in series with detecting relay coils 31 and 32, which in turn will close normally open contacts 33 and 34 when they are energized. The contacts 33 and 34 are respectively connected across the power supply in series with detecting memorizing relay coils 39 and 40 through normally closed contacts 35 and 36. The relay coils 39 and 40 are also connected across the power supply through holding contacts 37 and 38 respectively and through a normally closed switch contact 41 which is opened by relay coil 43, to be described below. Relay coils 39 and 40 respectively close holding contacts 37 and 38, and relay coil 39 opens contact 36 and relay coil 40 opens contact 35.

Thus, when a signal is received which closes, for example, the upper limit contact 29, the relay 31 is energized, closing the switch 33 and energizing the relay coil 39. The relay coil 39 in turn closes the contact 37 and opens the contact 36, thereby holding itself in the energized condition so as to memorize the detected condition and opening the circuit to the relay coil 40 for the lower limit. When a signal is received which closes the lower limit contact 30, the other set of contacts 34, 38 and 35 is actuated and the relay coil 40 is energized and the circuit to relay coil 39 is opened. The relay coils 39 and 40 also actuate other contacts in the circuit, as will be described below, and the contact 41 is used to de-energize the holding circuits in a manner to be described below.

Part $b$ of the circuit shown in FIG. 3 is a pulse switching circuit which has a pulse frequency timer operating relay 43 connected across the power supply in series with a limiting switch 42 which is opened and closed by means to be described hereinafter. Pulse frequency timer operating relay 43 actuates a normally open contact 46, and contact 46 is connected across the power supply in series with a pulse frequency timer 50. Normally closed contacts 49 are also connected across the power supply in series with the contact 46 and timer 50, and holding contact 47, also actuated by relay 43, energized by coil 47a is connected with the timer 50 in parallel with the contact 46. Also included in the circuit b is a normal pulse amplitude limit switch 51 which is opened and closed by the same means as is the limit switch 42, and the limit switch 51 is connected across the power supply in series with a normal pulse amplitude relay coil 53. In parallel with the limit switch 51 and in series with the relay coil 53 is a normally open holding contact 52 which is closed by the relay 53. Also included is a reverse pulse amplitude limit switch 54 which is opened and closed by the same means as is the limit switches 42 and 51, and the limit switch is connected across the power supply in series with the reverse pulse amplitude relay coil 56 and in series with the relay coil 56 is a normally open holding contact 55 which is closed by the relay 56. In series with both relay coils 53 and 56 is a normally closed contact 57 which is opened when relay coil 43 is energized. The circuit b also includes a pulse period timer 60 which is connected across the power supply in series with a normally open normal actuating contact 58 and a normally open reverse contact 59. The normal pulse amplitude relay coil 53 opens the contact 48 and closes the contact 58 when it is energized, and the reverse pulse amplitude relay coil 56 opens the contact 49 and closes the contact 59 when it is energized.

Thus, when the circuit is energized in response to a condition beyond the limits of control of the apparatus, the relay 43 is energized, the limit switch 42 being in the closed condition at the start of operation of the circuit. This closes the contacts 46 and 47, and since the contacts 48 and 49 are closed, the timer 50 runs for a predetermined time, which is adjustable for a period of from 0 to 5 minutes. This period of time corresponds to the periods $t_5$ and $t_7$ in FIG. 9. At the end of the predetermined time, the timer 50 actuates the means for determining the amplitude of the pulse and for opening and closing the limit switches 42, 51 and 54, the limit switch 42 being opened and either the normal pulse amplitude limit switch 51 or the reverse pulse amplitude limit-switch 54 being closed after a desired amplitude of the control pulse is reached, depending on whether the upper limit detecting relays 31 and 39 or the lower limit detecting relays 32 and 40 are energized. When the normal pulse amplitude limit switch is closed, the relay coil 53 will be energized, opening the contact 48 to break the holding contact 47 on the timer 50, and closing the contact 58 and energizing the timer 60 for determining the period $t_4$ and $t_6$ of the pulse, as shown in FIG. 9. On the other hand, if the reverse pulse amplitude limit switch 54 is closed, the relay coil 56 will be energized and the contact 49 will be opened and the contact 59 closed. After the timer 60 has run for the predetermined time, it actuates the means for opening and closing the limit switches 42, 51 and 54 to open either the switch 51, or 54, depending on which one is closed, and to close the switch 42, thereby again energizing the relay 43 and starting the timer 50 again. By this action the pulse amplitude is returned to zero and the timer 50 starts the interval $t_5$ to the next pulse. In order to deenergize the relay coils 53 and 56 so that contacts 48 and 49 are closed, when relay 43 is energized, contact 57 is opened, thereby breaking the circuit through the holding contacts 52 and 55 and relay coils 53 and 56.

Figure 6:
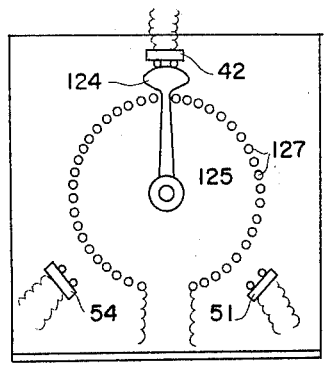
FIGURE 6 is a front view of a field magnet resistor.
Figure 7:
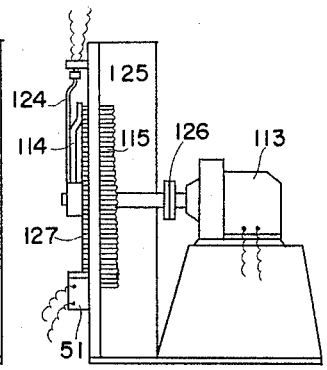
FIGURE 7 is a side view of the field magnet resistor of FIG. 6.

The means for actuating the limit switches 42, 51 and 54 is shown in FIGS. 6 and 7. A pulse control motor 113 has a coupling 126 on the shaft thereof to which is attached an arm 124 forming part of a driving motor field current regulator 125, and which is rotated by the motor in one or the other direction depending on the direction in which the motor 113 is driven. The arm 124 in the neutral position shown in FIG. 6 closes contact 42, and when it is driven in the clockwise direction closes the contact 51 and when it is driven in the counterclockwise direction closes the contact 54 after a certain period of time. Also attached to the shaft of the motor 113 is an arm 114 which on the shaft end is electrically connected through further field control resistance 115 to one side 44 of a power supply for a field winding 123a of a driving motor 123, and at the other end wipes across a variable field control resistance 115 in the form of a series of resistances 127 which are connected in series to the field winding 123a. The purpose of this control will be explained hereinafter.

Figure 5:
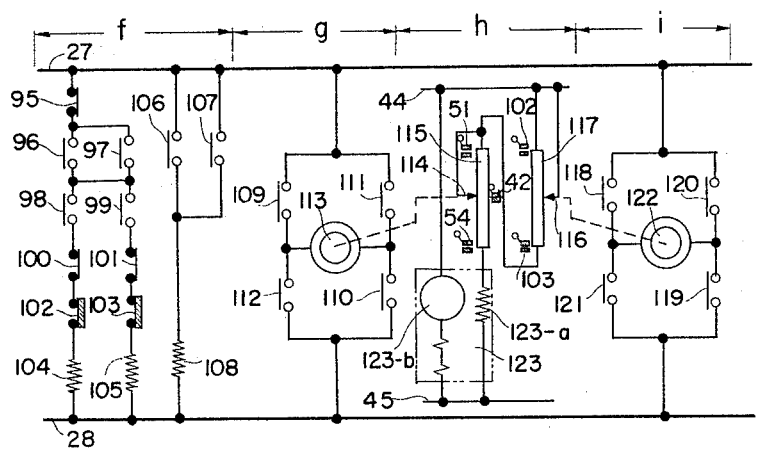

The control circuit for the pulse control motor 113 is illustrated in part g of the circuit shown in FIG. 5, and consists of a normal rotation energizing circuit connected across the power supply with normally open contacts 109 and 110 therein, and a reverse rotation energizing circuit connected across the power supply with normally open contacts 111 and 112 therein.

Figure 4:
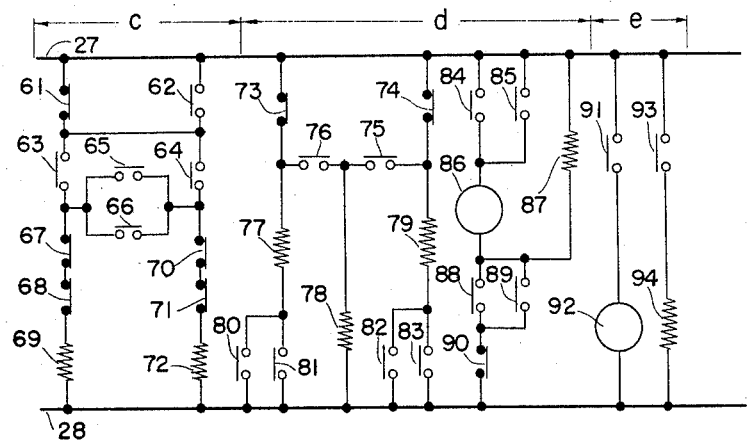

The pulse control circuit is shown in FIG. 4 as part c of the circuit and has two parallel circuits therein, one having a normally closed contact 61, which is opened when the relay 43 is energized, connected across the power supply in series with a normally open contact 63 which is closed by the energizing relay coil 39, two closed contacts 67 and 68, and a normal pulse control motor energizing relay coil 69. Relay coil 69 closes contacts 109 and 110 in the normal rotation energizing circuit for motor 113. The other has a normally open contact 62, which is closed by the timer 50 after the predetermined time, connected across the power supply series with a normally open contact 64 which is closed by the energizing relay coil 40, two normally closed contacts 70 and 71 and a reverse pulse control motor energizing relay coil 72. Relay coil 72 closes the contacts 111 and 112 in the reverse rotation energizing circuit for motor 113. The contact 67 in the one circuit is opened when relay coil 53 is energized and the contact 70 in the other circuit is opened when the relay coil 56 is energized. The contact 68 in the one circuit is opened when the relay coil 72 in the other circuit is energized, and the contact 71 is opened when the relay coil 69 in the one circuit is energized. The two parallel circuits are connected to each other between the contacts 61 and 63 in one circuit and 62 and 64 in the other circuit respectively. Between the contacts 63 and 67 in the one circuit and the contacts 64 and 70 in the other circuit are connected two normally open contacts 65 and 66 in parallel with each other. The contact 65 is closed by the timer 60 after a predetermined time, and the contact 66 is closed by a relay coil 78 in the part d of the circuits which will be described hereinafter.

The actions of the timers 50 and 60 to close and open the limit switch contacts 42, 51 and 54 of the pulse switching circuit b can now be described in greater detail. When the timer operating relay coil 43 is energized to start the timer 50 running, the contact 61 in the pulse control circuit will be opened. The timer controlled contact 62 will also be open. If the upper limit relay coil 39 is energized in the detecting circuit a, the contact 63 will be closed, whereas if the lower limit relay coil 40 is energized, the contact 64 will be closed. Thereafter, when the timer 50 has run for the predetermined time, the contact 62 is closed. Depending on whether the contact 63 or 64 is closed, either the normal pulse control motor energizing relay coil 69 or reverse pulse control motor energizing relay coil 72 is energized. Therefore, either the normal rotation energizing circuit or the reverse rotation energizing circuit for the motor 113 will be closed when the contacts 109 and 110, or 111 and 112 are closed. The motor 113 will then be rotated either clockwise or counter clockwise so as to open the contact 42 and close either the contact 51 or 54, depending on the direction of rotation.

Since the arm 114 is also rotated by the motor 113, the resistances 127 are either cut into or out of the field winding 123a of the driving motor 123, thereby changing the speed of the motor from an initial condition to a changed condition. This change in driving motor speed creates the amplitude $y_1$ or $y_2$ of the control pulse as shown in FIG. 9.

At the time either the contacts 51 or 54 are closed, thus energizing the relay coils 53 or 56 so as to start the timer 60, either the contact 67 or the contact 70 in the circuits of the pulse control circuit c is opened, thereby deenergizing either the relay coil 69 or the relay coil 72 and stopping the motor 113. The timer 60 therefore runs for the predetermined time with the motor 113 stopped with the driving motor 123 running at the changed speed. Thus, for as long as the timer 60 continues to run, the control pulse will be at its maximum amplitude, and the timer 60 determines the period of the pulse.

At the end of the predetermined period during which the timer 60 runs, the timer closes the contact 65. With the contact 42 open, the relay coil 43 has been deenergized, and contact 61 has therefore closed and contact 62 has opened. If the upper limit relay coil 39 is energized and the contact 63 is closed, the contact 67 will have been opened when the relay coil 53 is energized. Therefore, when contact 65 is closed a circuit is completed through the contacts 70 and 71 and the reverse pulse control motor energizing relay 72 will be energized. At this time, contact 68 will be opened to keep coil 69 from being energized, and the motor 113 will be run in the reverse direction to rotate the arm 124 back to its initial position in which it closes contact 42. When contact 42 is closed, relay coil 43 is again energized to start the timer 50 and to open the contact 61 to stop the running of motor 113. Relay coil 53 is deenergized when contact 51 is broken. It will be seen that by this action the arm 114 is returned to its initial position so that the resistances are changed in the field circuit 123a of the driving motor 123. This returns the speed of the driving motor 123 to the initial condition, thereby ending the control pulse. The running of the timer 50 starts the period $t_5$ or $t_7$ to the start of the next pulse, as shown in FIG. 9.

It will of course be understood that if the lower limit relay coil 40 is energized, the reverse action will take place in the circuit c thereby causing the motor 113 to return the arm from the position of contact 54 to that of contact 43. This will terminate a reverse control pulse in the same manner as a normal control pulse is terminated.

It will be further understood that as long as the detecting relay coils 31 or 32 and the relay coils 39 or 40 are energized due to the fact that the signals from the detected variable differ from the control signal against which they are compared, the pulses will be repeated. When the changed condition in the apparatus is corrected to within the limits $\Delta x$ the comparison of the signals will result in an absence of a signal which closes the contacts 29 and 30, so that the relay coils 31 or 32 will be deenergized resulting in the opening of contacts 33 and 34. If at this time the control circuits are between pulses and the timer 50 is running with the contact 46 held closed by the relay coil 43, the contact 41 will be held open, with the result that the circuits through relay coils 39 or 40 will be broken and the contacts 63 or 64 will open. The circuits will then not be actuated at the end of the timed period of the timer 50, and no further control pulses will be imposed on the field winding of the motor 123. However, if the control circuit is in the middle of a pulse, the timer 50 will be stopped and the relay coil 43 will be deenergized. The contact 41 will therefore be closed, completing the holding circuit through either contact 37 or 38 to either relay coil 39 or 40. The control circuit is then in a condition to terminate the pulse and return the driving motor 123 to the initial speed. The manner in which this is done will be described hereinbelow in connection with the portion d of the circuit shown in FIG. 4.

The portion d of the circuit is an accumulating and memorizing circuit which has a first portion with two parallel circuits. The first circuit has a normally closed contact 73 which is opened when the relay coil 32 in the detecting part a of the control circuit is energized, which contact is in series with a normal memorizing timer driving relay coil 77 and a normally open contact 80 which is closed by the relay coil 39. A normally open holding contact 81 is connected in parallel with the contact 80 and is closed by the relay coil 77. The other circuit has a normally closed contact 74 which is opened by the relay coil 31 in the detecting part a of the control circuit, which contact is in series with a reverse memorizing timer driving relay coil 79 and a normal open contact 82 which is closed by the relay coil 40. A normally open holding contact 83 is connected in parallel with the contact 82 and is closed by the relay coil 79. One side of a normally open contact 76, which is closed by the relay coil 56 in the pulse switching circuit which forms part b of the control circuit, is connected to the one circuit between contact 73 and relay coil 77, and the other side is connected in series wih a pulse terminating relay coil 78 to the other side of the power supply. One side of a normally open contact 75, which is closed by the relay coil 53 in the pulse switching circuit, is connected to the other circuit between contact 74 and relay coil 79, and the other side is connected in series with the pulse terminating relay coil 78. The accumulating and memorizing circuit also has two normally open contacts 84 and 85, contact 84 being closed by relay coil 31 and contact 85 being closed by relay coil 32, the contacts 84 and 85 being connected across the power supply in series with an accumulating timer 86, normally open contact 88 and normally closed contact 90. Contact 88 has a normally open contact 89 connected in parallel therewith, the contact 88 being closed by the relay coil 77 and the contact 89 being closed by the relay coil 79. Contact 90 is opened by a relay coil 94 in the part e of the control circuit, to be described below. The contacts 88 and 89 are also in series with an electromagnetic braking coil 87 for the take gear of the timer 86.

It will be seen that with the control circuit pulsing in the normal manner when either the relay coils 31 or 32 and relay coils 39 or 40 energized, either the contact 74 will be open when the contact 75 is closed by the relay coil 53 during pulsing to correct for deviations in the normal direction, or the contact 73 will be open when the contact 76 is closed by the relay coil 56 during pulsing to correct for deviations in the reverse direction. However, when the correction has been completed, and detected variables which are being controlled return to within the range $\Delta x$, as seen in FIG. 9, the relay coils 31 and 32 will be deenergized and the open contact 73 or 74 will be closed. If the control circuit is between pulses with only the timer 50 running, the circuit will stop pulsing as explained above. If the control circuit is in the middle of a pulse, the switch 75 or 76 will be closed, depending on whether it is a normal or a reverse pulse, and a circuit will be completed through relay coil 78, which will close the contact 66 in portion c of the control circuit. This will cause the motor 113 to run in the reverse direction to that in which it created the pulse amplitude until the pulse amplitude is reduced to zero, in the manner explained above. At this point, the switch 42 will be closed, energizing relay coil 43 and opening contacts 37 and 38, and relay coil 39 or 40 will be deenergized, thereby stopping the pulsing.

Moreover, when the relay coil 31 or 32 is first energized, and either relay coil 39 or 40 is energized as a result thereof, either the contact 80 or the contact 82 and its respective holding contact 81 or 83 are closed so as to energize either relay coil 77 or 79. Contact 84 or 85 is also closed, so that when either relay coil 77 or 79 is energized, the contact 88 or 89 is closed to drive the timer 86. The timer 86 will be driven either intermittently or steadily depending on whether the pulsing starts and stops or continues steadily. The timer 86 is connected to means for controlling the drive motor 123 to correct for a continuation deviation of controlled conditions in a series of steps, in a manner described below.

Part $e$ of the control circuit is a step switching circuit, and has a normally open contact 91, which is closed by relay coil 108 in part $f$ of the circuit, connected across the power supply in series with a timer 92 to control the length of time between the control steps. This part of the circuit also has a normally open contact 93, which is closed by the timer 92 connected across the power supply in series with a relay coil 94 which opens the contact 90 in the part $d$ of the circuit.

The part $f$ of the control circuit is a step controlling circuit and has a normally closed contact 95 which is opened by the relay coil 94 in the part $e$ of the circuit. The contact 95 is connected across the power supply in series with two parallel circuits, the first of which has normally open contacts 96, and 98, normally closed contact 100, normal step amplitude limit switch 102 and normal step control motor actuating relay coil 104 all in series. The other circuit has normally open contacts 97 and 99, normally closed contact 101, reverse step amplitude limit switch 103 and reverse step control motor actuating relay coil 105 all in series. The two parallel circuits are connected between the normally open contacts 96 and 98 in one circuit and normally open contacts 97 and 99 in the other circuit. Contact 96 is closed by the timer 86 in the part $d$ of the control circuit, while contact 97 is a hold contact closed by relay coil 108 described below. Contact 98 is closed by relay coil 39 and contact 99 is closed by relay coil 40. Contact 100 is opened by relay coil 105, while contact 101 is opened by relay coil 104. Two parallel normally open contacts 106 and 107 are connected in series with an auxiliary relay coil 108, the contact 106 being closed by the relay coil 104 and the contact 107 being closed by the relay coil 105, and the relay coil 108 closing the holding contact 97.

Part $i$ of the control circuit is the step control motor circuit, and has a step control motor 122 with an arm 116 thereon wiping over a variable field control resistance 117 to vary the total resistance thereof. The resistance and the arm are connected across a power supply 44–45 for the driving motor 123 in series with the variable field control resistance 115 described above. At the ends of the movement of the arm 116 are the limit switches 102 and 103 in the step controlling circuit part $f$. A normal rotation energizing circuit containing normally open contacts 118 and 119 is connected across the power supply and the motor 122, and a reverse rotation energizing circuit containing normally open contacts 120 and 121 is also connected across the power supply and the motor 122.

Thus, with the contact 95 in the step controlling circuit part $f$ closed and either the contact 98 closed by the relay coil 39 or the contact 99 closed by the relay coil 40, when the timer 86 reaches the predetermined time limit, it closes the contact 96. Depending on whether the contact 98 or 99 is closed, either the relay coil 104 or 105 will be energized, thereby opening either contact 100 or 101 to cut out the other relay coil, and either contact 106 or 107 will close, thereby energizing the relay coil 108. This in turn will close the holding contact 97 and will also close the contact 91 for the timer 92. If relay coil 104 is energized, the normal rotation energizing circuit of the motor 122 will be energized, thereby rotating the arm 116 and changing the total resistance in the field circuit of the driving motor 123. This movement will continue until the timer 92 has run for a predetermined length of time, at which time the contact 93 will close so as to energize the relay coil 94. This will open the contact 90 and stop the timer 86, and at the same time will open the contact 95 so as to deenergize the relay coil 104 and stop the motor 122 with the arm 116 at a new position and the field resistance of the driving motor at a new value. This will in turn cause the driving motor 123 to run at a changed speed and change the base line in FIG. 9 by an amount $y_4$. The pulses will now take place from the new line.

If the relay coil 105 is energized, the circuit will operate to run the motor 122 in the opposite direction to make a correction in the reverse manner. If the arm 116 should reach the end of the resistances 117, it will open the contact 102 or 103 and stop the operation of the circuit.

There has therefore been provided a control for an apparatus, in the present case a sintering machine, in which a rectangular wave type control in the form of a series of pulses is combined with a step type control, so that where there is a sudden fluctuation in the operation of the apparatus, the control system will respond quickly with a series of pulses, and if the sudden fluctuation ceases, the pulsing control will cease after having compensated for the sudden fluctuation. On the other hand, when the fluctuation is of a more permanent nature, the control system, after attempting to control the operation of the apparatus with a series of pulses, will apply a step type of control correction, thereby compensating for the more permanent fluctuation. In this manner, no cycling of the operation of the apparatus will occur, and in the case of a sintering machine, for instance, the sintering conditions will remain substantially constant.

For the sake of simplicity, the amplitudes periods and frequencies of the pulses, and the amplitude of the step and the interval during which pulses only are used preceding a step type of control have been described as being constant for all pulses and steps. However, by providing modified timers, it will be possible to vary these factors so as to make the amplitude of successive pulses different, make the frequency vary, and have pulses of different periods. The same variations can be made to occur in the step control.

It is thought that the invention and its advantages will be understood from the foregoing description and it is apparent that various changes may be made in the form, construction and arrangement of the parts without departing from the spirit and scope of the invention or sacrificing its material advantages, the form hereinbefore described and illustrated in the drawings being merely a preferred embodiment thereof.

What is claimed is:

1. A method of controlling the operation of a Dwight-Lloyd type of sintering machine in which the variable conditions of the thickness of the layer of material being sintered and the temperature and pressure of the waste gases indicate the correctness of the operation of the machine, and the operation of the machine is accomplished by driving the main conveyor, driving the feeding means, and driving the cooling means, said method comprising detecting at least one of said variable conditions, comparing the value of said variable condition with an optimum value for said condition, and when said variable condition varies from the optimum value by more than a predetermined amount, applying to the drives for the machine a plurality of rectangular wave type control pulses to cause the speeds of the drives to vary in the shape of rectangular waves until the detected variable condition no longer varies from the optimum value by more than a predetermined amount, and when at least one of the detected variable conditions has varied from the optimum value by more than a predetermined amount for a predetermined length of time, applying to said drives a step type of control to cause the speeds of the drives to change without returning to their values previous to the step type of control.

2. A method of controlling the operation of a sintering apparatus in which detectable variable conditions indicate the correctness of the operation of the apparatus, and the operation of the sintering apparatus is accomplished by manipulated inputs to the sintering apparatus, said method comprising detecting a plurality of the variable conditions, comparing the value of said conditions with an optimum value for each condition, and when at least one of said variable conditions varies from the optimum value for said variable condition by more than a predetermined amount, applying to the manipulated inputs to the apparatus a plurality of rectangular wave type control pulses to cause the values of the manipulated inputs to vary in the shape of rectangular waves until the detected variable condition no longer varies from the optimum value by more than a predetermined amount, and when at least one of the detected variable conditions has varied from the optimum by more than a predetermined amount for a predetermined length of time, applying to said manipulated inputs a step type of control to cause the value of the manipulated inputs to change without returning to their value previous to the step type of control.

3. A method of controlling the operation of apparatus in which detectable variable conditions indicate the correctness of the operation of the apparatus, and the operation of the apparatus is accomplished by manipulated inputs to the apparatus, said method comprising detecting at least one of the variable conditions, and when said variable condition varies from a desired optimum, applying to at least one of the manipulated inputs to the apparatus at least one rectangular wave type control pulse to cause the value of the manipulated input to vary in the shape of a rectangular wave, continuing to apply rectangular wave type control pulses until the detected variable condition returns to the desired optimum and when the detected variable condition has deviated from the desired optimum for a predetermined length of time, applying to said manipulated input a step type of control to cause the value of the manipulated input to change without returning to its value previous to the step type of control.

4. In combination, a sintering apparatus in which the variable conditions of the thickness of the layer of material being sintered and the temperature and pressure of the waste gases indicate the correctness of the operation of the apparatus, and having driving means to supply drives to the machine, and a control system for controlling the operation of the apparatus, and comprising detecting means for detecting the value of at least one of said variable conditions, comparing means coupled with said detecting means for comparing the value of the detected condition with an optimum value and producing an output when the two values vary by more than a predetermined amount, control pulse producing means for producing a series of rectangular wave type control pulses coupled to said comparing means, control step producing means for memorizing the time during which pulses are produced and producing a control step after a predetermined time and coupled to said comparing means, and means for controlling the driving means coupled to said control pulse producing means and said control step producing means and coupled to said driving means.

5. In combination, an apparatus in which detectable variable conditions indicate the correctness of the operation of the apparatus and having means supplying manipulated inputs to said apparatus, and a control system for controlling the operation of said apparatus, and comprising detecting means for detecting the value of at least one of said variable conditions, comparing means coupled with said detecting means for comparing the value of the detected condition with an optimum value and producing an output when the two values vary by more than a predetermined amount, control pulse producing means for producing a series of rectangular wave type control pulses coupled to said comparing means, control step producing means producing a control step after a predetermined time and coupled to said comparing means, and means for controlling the manipulated input supply means coupled to said control pulse producing means and control step producing means and coupled to said manipulated input supply means.

6. The combination as claimed in claim 5 in which said detecting means comprises means for detecting said variable condition as an electric signal, said comparing means comprises a circuit for comparing two electric signals and a detecting, controlling and memorizing circuit for detecting the difference between two compared signals, for controlling further circuits, and for memorizing that the difference between the compared signals is greater than a predetermined amount, said control pulse producing means comprises a pulse switching circuit for producing rectangular wave type control pulses at spaced intervals of time and a pulse control circuit connected to said pulse switching circuit for controlling the amplitude of the pulses, and said control step producing means comprises an accumulating and memorizing and step switching circuit for memorizing the sense in which the signal representing the difference between the two compared signals differs from the optimum and for producing a step control after the compared signals have differed for a predetermined time, and a step control circuit for controlling the amplitude of the step control.

7. The combination as claimed in claim 5 in which said means for controlling the manipulated input supply means comprises a controller for the control pulse producing means and a controller for the control step producing means.

8. The combination as claimed in claim 7 in which said controllers are coupled to said manipulated input supply means in parallel.

9. The combination as claimed in claim 7 in which said controllers are coupled to said manipulated input supply means in series.

10. A control system for controlling the operation of detectable variable conditions indicate the correctness of the operation of the apparatus, and which apparatus has means supplying manipulated inputs to said apparatus, said control system comprising detecting means adapted to detect the value of at least one of said variable conditions, comparing means coupled with said detecting means for comparing the value of the detected conditions with an optimum value and producing an output when the two values vary by more than a predetermined amount, control pulse producing means for producing a series of rectangular wave type control pulses coupled to said comparing means, control step producing means for memorizing the time during which pulses are produced and producing a control step after a predetermined time and coupled to said comparing means, and means adapted to control the manipulated input supply means coupled to said control pulse producing means and said control step producing means and being adapted to be coupled to said manipulated input supply means.

No references cited.

BENJAMIN HENKIN, *Primary Examiner.*